No. 860,393. PATENTED JULY 16, 1907.
W. K. LEES.
NUT LOCK.
APPLICATION FILED SEPT. 24, 1906.

Witnesses.
Inventor.
William K. Lees.
By James L. Norris.
Atty.

THE NORRIS PETERS CO., WASHINGTON, D. C.

UNITED STATES PATENT OFFICE.

WILLIAM K. LEES, OF PATAGONIA, ARIZONA TERRITORY.

NUT-LOCK.

No. 860,393.        Specification of Letters Patent.        Patented July 16, 1907.

Application filed September 24, 1906. Serial No. 336,007.

*To all whom it may concern:*

Be it known that I, WILLIAM K. LEES, a citizen of the United States, residing at Patagonia, in the county of Santa Cruz and Territory of Arizona, have invented new and useful Improvements in Nut-Locks, of which the following is a specification.

This invention relates to nut locks including those classes which have means directly operating with recesses formed in the outer face of a rail plate to hold the nut against accidental disengagement and with such resistance as to obviate the loosening of the nut when subjected to vibration, and also contemplating a nut having locking means coöperating with a device interposed therebetween and the outer surface of the fish plate and also setting up a resistance to accidental disengagement of the nut.

The invention consists in the construction and arrangement of the several parts which will be more fully hereinafter set forth.

Figure 1:
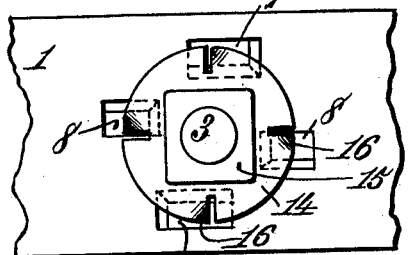
Figure 2:
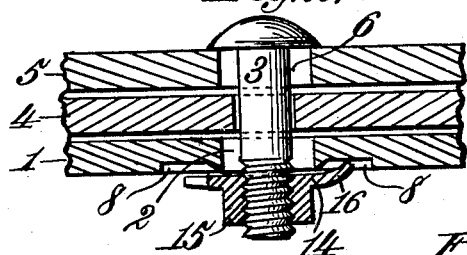
Figure 3:
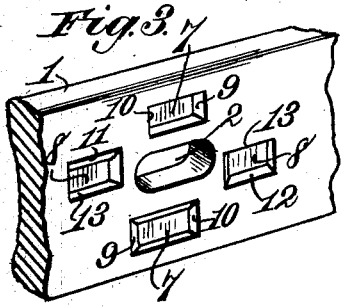
Figure 4:
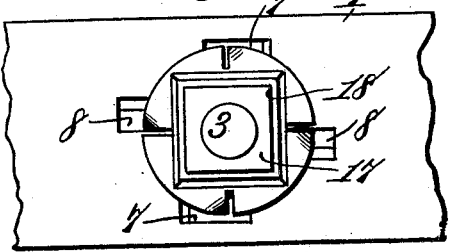
Figure 5:
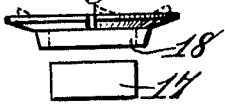

In the drawings, Figure 1 is an elevation of a fish plate or analogous interposed member and a nut and bolt embodying the features of the invention. Fig. 2 is a horizontal section through the fish-plate or analogous member and nut, and also a portion of a railroad rail and the accompanying plate on the opposite side of the latter to engage the head of the bolt. Fig. 3 is a detail view of a portion of the fish-plate or analogous member with which the locking nut coöperates. Fig. 4 is a view similar to Fig. 1, showing a slight modification in the locking nut. Fig. 5 is a top plan view of the devices shown by Fig. 4.

Similar numerals of reference are employed to indicate corresponding parts in the several views.

Referring to the drawings, the numeral 1 designates a fish-plate or analogous element for interposition between a nut and a structure with which it is proposed to use a connecting bolt and the improved locking nut. This plate or member 1 has an elongated opening 2 formed therein for the passage therethrough of a bolt 3, and as many of these openings may be used as there are bolts required to secure the parts of the structure in respect to which it is desired to use the improved nut locking organization. When the part 1 constitutes a fish-plate it will be placed against the side of a rail 4 and coöperate with a similar part or fish-plate 5 on the opposite side of the rail, the bolt 3 being inserted through both plates and the web of the rail, as shown by Fig. 2, and the plate 5 also having an elongated opening 6 formed therein and extending longitudinally of the plate and similar to the opening 2 hereinbefore set forth. These elongated openings 2 and 6 provide for expansion and contraction of the structure with which said plates coöperate and engaged by the bolt 3, or a number of such bolts. The plates or members 1 will be held in immovable relation against the opposite sides or against one side of the structure with which the bolt 3 coöperates, either by bearing on an angular projection at the lower edge, as, for instance, the flange of a rail, or any other means may be employed for engaging such lower edge and preventing the plate or member from having movement. In this form of the nut lock the plate or member 1 is the salient resisting means for securing the nut against movement, and above and below the opening 2 elongated recesses 7 are longitudinally formed in the plate or member, and between said recesses are other similar recesses 8 at different elevations and also disposed longitudinally.

The recesses 7 have one end wall 9 of each inclined inwardly, said end walls being in reverse positions in the respective recesses, and the opposite end walls of these recesses 7 are formed as vertically straight abutting edges or shoulders 10. The recesses 7 and 8 do not have their end walls in vertical alinement, the lower recess 7 being located at a greater distance to one side of a vertical line drawn centrally through the opening 2 than the upper recess 7. The upper wall of the left hand recess 8 is inclined inwardly and downwardly, as at 11, and the lower wall 12 of the right hand recess 8 is upwardly and inwardly inclined, and the walls of the two recesses 8 opposite the inclined walls 11 and 12 are straight and form elongated shoulders 13. The upper longitudinal straight wall 13 of the right hand recess 8 is about in alinement with the lower straight wall 13 of the left hand recess. The elongation of the recesses 7 and 8 provides for the expansion and contraction of the structure engaged by the bolt or bolts 3, and coöperating with the said recesses is a locking disk or member 14, connected, in this form of the device, to the usual nut 15, the disk or member 14 being thus made rotatable with the nut. At intervals, or as shown at diametrically opposite points, the periphery of the disk or member 14 has slots cut therein to provide teeth or detents 16, which have a yielding operation to ride over the outer surface of the plate 1 and are adapted to be struck inwardly by a suitable implement to engage the several recesses after passing the inclined walls, respectively at the ends and sides of the said recesses, as explained and shown by Fig. 2. The one side edge of each tooth or detent 16 abuts against the straight end or side wall of the recess with which it engages and prevents the disk or member 14 and the nut 15 connected thereto from becoming accidentally disengaged from the bolt 3.

In Figs. 4 and 5 practically the same construction is shown as just described, with the exception that the disk or member 14 is provided with an angular socket 18 in which the nut 17 is fitted, so as to cause the nut and disk or member to turn together in applying or disengaging the nut.

The nut lock described is simple in its operation as well as strong and durable and expansion and contraction are fully compensated for and the bolt or bolts are permitted to move from right to left owing to the elongation of the recesses 7 and 8 and the extended bearing of the shoulders thereof. Bent, broken or sheared track bolts are obviated by the use of the improved nut lock, as the movement or strain, if any exists on the bolts, is equal in opposite directions. The walls of the bolt openings, as well as the openings in the plates interposed between the secured structure and the disks or locking members and nuts are also preserved in their original condition, and by the assemblage of a number of elongated bolt openings, particularly as shown by Fig. 2, an extended bearing for each bolt is provided which will reinforce and strengthen the bolt and overcome any tendency to bending, breaking or shearing of the same, hence the improved nut lock structure is not liable to get out of order or become jammed so that in the event of a separation of parts thereof by regular methods, or the application of extraneous force is necessary and is pursued, the nuts may be readily detached. Furthermore, the improved nut lock may be generally applied and is adaptable for many purposes, though particularly intended for use in connection with rail joints.

Another advantage of the improved nut lock is that the nut need not be screwed up to such a tight condition with respect to the interposed plate to effect a positive lock of the nut, and which frequently has the tendency to break the bolt or crush the threads of the latter, in view of the fact that the teeth or detents of the interposed disk or washer spring into the recesses or bear against the shoulders provided therefor when they are disposed in proper positions without requiring a close jam.

The fish or other plate 1 used in connection with the nut lock and forming a part of the latter may be of angular form, which is well known in the art. The nuts may also be of any contour, either square or polygonal.

Having thus described the invention, what is claimed, is:

In a nut lock, the combination with a bolt, of a structure engaged by the bolt, a nut, a nut locking member provided with spring detents, a plate device interposed between the locking member and the structure and having an elongated bolt opening therethrough, and recesses above and below and adjacent to the opposite terminals of the bolt opening, the recesses extending longitudinally of the plate and all out of alinement with relation to each other and having inclined walls and end shoulders in different positions therein to facilitate engagement of the detents with the said recesses and to prevent accidental movement of the locking member after the detents bear on the shoulders of the recesses, the locking member being rotatable with the nut to bring the detents in locking relation to the recesses.

In testimony whereof I have hereunto set my hand in presence of two subscribing witnesses:

WILLIAM K. LEES.

Witnesses:
ALLEN T. BIRD,
M. N. ANDREWS.